United States Patent [19]
Yamamoto

[11] Patent Number: 5,893,813
[45] Date of Patent: Apr. 13, 1999

[54] SPEED REDUCER

[75] Inventor: Haruhisa Yamamoto, Fujisawa, Japan

[73] Assignee: Canon Kabushiki Kaisha, Tokyo, Japan

[21] Appl. No.: 08/926,465

[22] Filed: Sep. 10, 1997

Related U.S. Application Data

[63] Continuation of application No. 08/576,901, Dec. 22, 1995, abandoned.

[30] Foreign Application Priority Data

| Dec. 27, 1994 | [JP] | Japan | 6-325251 |
| Dec. 27, 1994 | [JP] | Japan | 6-325252 |
| Dec. 27, 1994 | [JP] | Japan | 6-325253 |
| Dec. 27, 1994 | [JP] | Japan | 6-325254 |
| Oct. 6, 1995 | [JP] | Japan | 7-260165 |
| Nov. 29, 1995 | [JP] | Japan | 7-310897 |

[51] Int. Cl.$^6$ .............. G03B 7/00; F16H 71/00; F16H 5/00; F16H 1/00
[52] U.S. Cl. .............................. 475/163
[58] Field of Search ............................. 475/163

[56] References Cited

U.S. PATENT DOCUMENTS

| 3,587,350 | 6/1971 | Wanlass | 475/163 |
| 3,977,275 | 8/1976 | Kiesewetter et al. | 475/163 |
| 4,041,808 | 8/1977 | Fickelscher | 475/163 |

FOREIGN PATENT DOCUMENTS

| 0102889 | 3/1984 | European Pat. Off. . |
| 3341558 | 6/1984 | Germany . |
| 63-194212 | 8/1988 | Japan . |
| 63-214544 | 9/1988 | Japan . |
| 4191546 | 7/1992 | Japan . |
| 599283 | 4/1993 | Japan . |
| 2011016 | 7/1979 | United Kingdom . |
| 2 134 208 | 8/1984 | United Kingdom . |

*Primary Examiner*—Dirk Wright
*Attorney, Agent, or Firm*—Fitzpatrick, Cella, Harper & Scinto

[57] ABSTRACT

A speed reducer having a fixed first member, a second member opposed to the first member, a pressing member and for inclining the second member and making it bear against the first member. The pressing member also presses the second member so that the bearing portion thereof may describe a circular locus. Also provided are an output shaft and a connecting member connecting the second member and the output shaft together.

14 Claims, 12 Drawing Sheets

SPEED REDUCER

This application is a continuation, of application Ser. No. 08/576,901, filed Dec. 22, 1995, now abandoned.

BACKGROUND OF THE INVENTION

1. Field of the Invention

This invention relates to a speed reducer which can obtain a high speed reduction ratio by a single stage.

2. Related Background Art

Various speed reducing mechanisms have heretofore been proposed to make high speed rotation into low speed rotation, and speed reducers as shown below are known.

(1) First Example of the Conventional Art

A transmission using a plurality of stages of gear trains such as spur gears, bevel gears and worm gears or using planetary gears to effect speed reduction.

(2) Second Example of the Conventional Art

A transmission using a harmonic drive mechanism which is one type of mechanism utilizing a difference in the number of teeth to effect speed reduction.

(3) Third Example of the Conventional Art

A transmission using a resiliently deformable wave gear described in Japanese Laid-Open Patent Application No. 63-214544 which is another one of the mechanisms utilizing a difference in the number of teeth to effect speed reduction.

(4) Fourth Example of the Conventional Art

A transmission using a universal joint or a ball described in Japanese Laid-Open Patent Application No. 4-191546 and Japanese Laid-Open Patent Application No. 5-99283 to pivotally move a pivotally movable bevel gear, is another one of the mechanisms utilizing a difference in the number of teeth to effect speed reduction.

The transmission according to the above-described third example of the conventional art is shown in FIG. 5 of the accompanying drawings. In FIG. 5, the reference numeral 30 designates a wave gear having a toothed portion 30A formed on the peripheral portion of the end surface thereof. The reference numeral 31 denotes a speed change gear having a toothed portion 31A formed on the peripheral portion of the end surface thereof, the toothed portion 31A differing in the number of teeth from the toothed portion 30A. The reference numeral 32 designates the rotary shaft of a motor which forms an input shaft, the reference numeral 33 denotes an arm, the reference numeral 34 designates a roller provided on the tip end portion of the arm 33, and the reference numeral 35 denotes a chassis. In this transmission, the wave gear 30 urged by the roller 34 is resiliently deformed and the toothed portion 30A thereof is in meshing engagement with the toothed portion 31A of the speed change gear 31, and when the arm 33 is rotated about the rotary shaft, the meshing position shifts sequentially.

Assuming here that the wave gear 30 is fixed in the direction of rotation thereof, the speed change gear 31 is squeezed by one pitch each of the gear and is rotated. Accordingly, if for example, the number of teeth of the wave gear 30 is 64 and the number of teeth of the speed change gear 31 is 66, when the arm 33 effects one full rotation, the speed change gear 31 is rotated by an amount corresponding to the difference in the number of teeth because the difference in the number of teeth is two. That is, it is rotated by $1/33$ ($2/66$).

The transmission according to the above-described fourth example of the conventional art is shown in FIG. 6 of the accompanying drawings. In FIG. 6, the reference numeral 40 designates a casing, the reference numeral 41 denotes an input shaft, the reference numeral 42 designates an input rotor, the reference numeral 43 denotes an input side gear, the reference numeral 44 designates a rotary bearing ball, the reference numeral 45 denotes an output shaft, the reference numeral 46 designates a detent roller pin, the reference numeral 47 denotes a slit groove, and the reference numeral 48 designates an output side gear. When the input shaft 41 is rotated, the input rotor 42 fixed to the input shaft 41 and formed with an inclined end surface is also rotated, and the input side gear 43 which is sliding contact therewith is pivotally moved about the rotary bearing ball 44.

The input side gear 43 is not rotated because the detent roller pin 46 mounted on the outer periphery thereof fits in the slit groove 47 formed in the casing 40. When the input rotor 42 which is in sliding contact with the back of the input side gear 43 effects one full rotation, the input side gear 43 is pivotally moved and the output side gear 48 partly meshing with the input side gear 43 is rotated by an amount corresponding to the difference in the number of teeth therebetween.

If for example, the number of teeth of the input side gear 43 is 100 and the number of teeth of the output side gear 48 is 99, when the input side gear 43 effects one full rotation, the input side gear 43 meshes with the output side gear 48 by an excess amount corresponding to the difference in the number of teeth because the difference thereof in the number of teeth from the output side gear 48 is one tooth. That is, it is rotated by $1/100$.

However, the following problems are pointed out in the above-described examples of the conventional art.

(1) Regarding the First Example of the Conventional Art

When spur gears, bevel gears or planetary gears are used, $1/2$ to $1/3$ is suitable as a speed reduction ratio per stage of gears, and when an attempt is made to obtain a high speed reduction, a plurality of stages of gear trains become necessary, and this leads to the fault that the apparatus becomes bulky.

Also, when worm gears are used, a high speed reduction is obtained by a single stage, but generally transmission efficiency is as bad as 40%.

(2) Regarding the Second Example of the Conventional Art

The transmission using a harmonic drive mechanism can obtain a high speed reduction ratio by a single stage, but it is difficult to make the thickness small, and the number of parts is increased as by the use of ball bearings, and this leads to the disadvantage of expensiveness.

(3) Regarding the Third Example of the Conventional Art

This example is characterized by a resiliently deformable wave gear, and a resilient material is used for the gears and constantly deformed gears opposed to each other are forced to mesh with each other for use and therefore, from the viewpoints of the mechanical strength of the resilient member and the constitution of the constituent parts, this example is applied, for example, to compact products for public welfare which are low in torque and do not much require the accuracy of rotation and durability.

(4) Regarding the Fourth Example of the Conventional Art

Use is made of a pivotally movable gear and an output bevel gear formed of a rigid material, and the pivotally movable gear is regulated in the direction of rotation by the use of a universal joint or a pivot bearing using balls and a pin, and the shaft of the output bevel gear opposed thereto provides an output shaft, but from the viewpoint of the rigidity of the material forming the pivotally movable gear and output bevel gear, particularly the mechanism which can withstand even a high load from the output shaft side, and the constitution of the constituent parts, this construction is directed, for example, to products for industry and for heavy machines which are high in torque and moreover require durability.

Consequently, when this Example is used as a compact transmission, it becomes difficult for it to become compact, and particularly thin, and since a roller pin is used for the regulation of rotation, the roller pin strikes against a slit groove in a casing during rotation while being pivotally moved and thus, backlash is liable to occur, and this leads to the occurrence of backlash and the irregularity of rotation at the start.

SUMMARY OF THE INVENTION

It is a first object of the present invention to provide a speed reducer which can obtain a high speed reduction ratio by a single stage at transmission efficiency approximate to that of a spur gear.

It is a second object of the present invention to provide a speed reducer which can obtain stable rotation free of the backlash of an output shaft at the start.

It is a third object of the present invention to provide a speed reducer which is simple in structure and excellent in durability and moreover can be manufactured inexpensively.

A feature of the present invention resides in a speed reducer having a fixed first member, a second member opposed to the first member, a pressing member for inclining the second member and causing it to bear against the first member, and pressing the second member so that this bearing portion may describe a circular locus, an output shaft, and a connecting member for connecting the second member and the output shaft together. Alternatively, the speed reducer can have a first gear fixed to a casing and disposed in the form of a ring, a second gear connected to an output shaft, having a difference in the number of teeth from the first gear and disposed in opposed relationship with the first gear and in the form of a ring, and pressing means for pressing a portion of the second gear into meshing engagement with the first gear while rotating with an input shaft, the second gear being capable of being pressed by the pressing means to thereby obtain a high speed reduction ratio while the second gear is pivotally moved about the output shaft.

Other features of the present invention will become apparent from the following detailed description.

DESCRIPTION OF THE PREFERRED EMBODIMENTS

Figure 1:
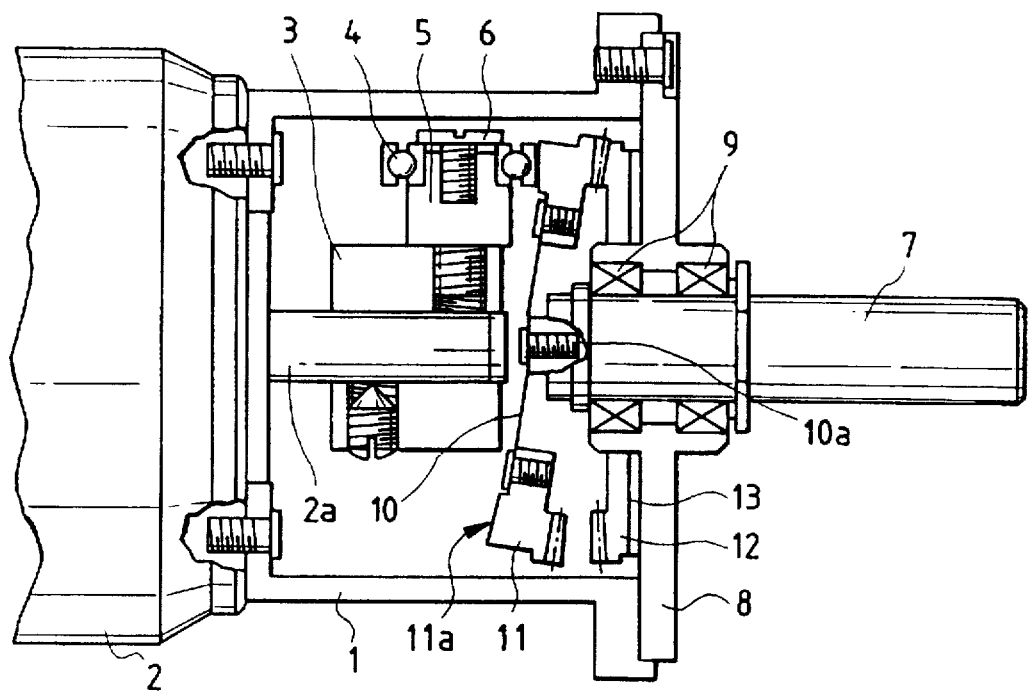
FIG. 1 shows a first embodiment of a speed reducer according to the present invention.

FIG. 1 shows a first embodiment of a speed reducer according to the present invention.

The reference numeral 1 designates a casing fixed to the fore end portion of a motor body 2 coaxially therewith. The rotary shaft (input shaft) 2a of the motor body 2 is inserted in the casing 1, and a rotor 3 is fixed to the fore end portion of the rotary shaft 2a by screws. This rotor 3 is such that a support shaft 5 is studded relative to the rotary shaft 2a in a direction orthogonal to the rotary shaft 2a and a radial bearing 4 is fixed to the support shaft 5 by a set screw 6. These members 3, 4, 5 and 6 together constitute a pressing member. The reference numeral 7 denotes an output shaft disposed coaxially with the rotary shaft 2a and mounted on the casing lid 8 of the casing 1 through radial bearings 9.

Figures 4A, 4B:
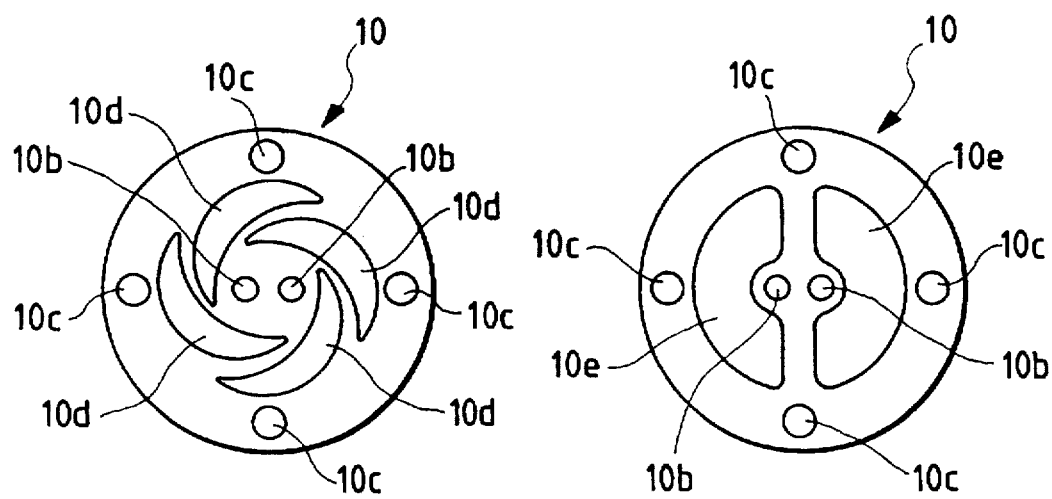
FIGS. 4A and 4B show a transmitting member (connecting member) in the third embodiment.
Figure 5:
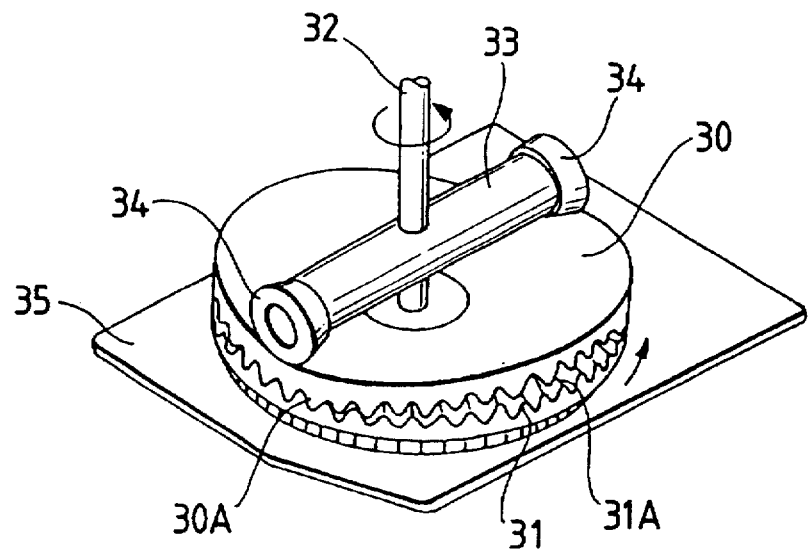
FIG. 5 shows a speed reducer according to the conventional art.
Figure 6:
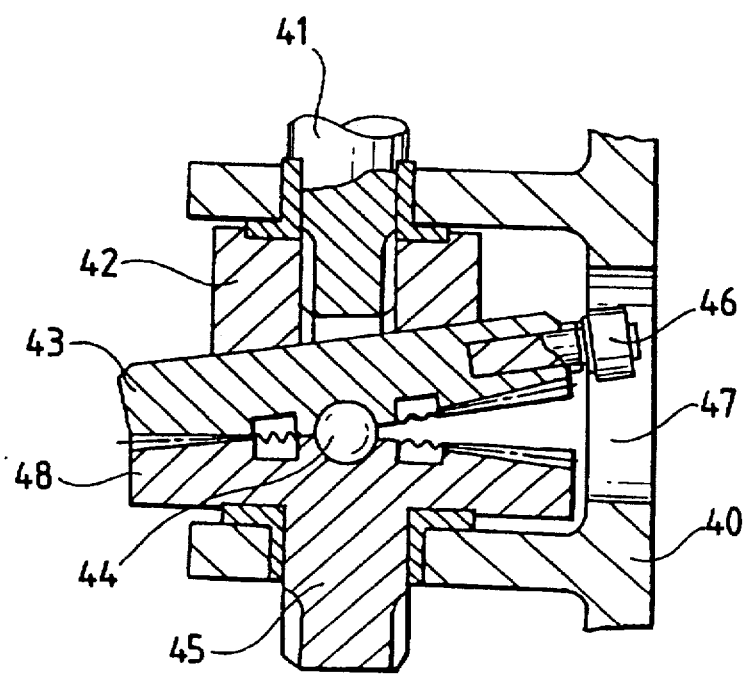
FIG. 6 shows the speed reducer according to the conventional art.

The reference numeral 10 designates a disc-shaped transmitting member formed by a springy thin plate and fixed to one end portion of the output shaft 7 by a screw 10a and having a pivotally movable gear 11 fixed to the outer peripheral portion thereof. The transmitting member 10 connects the gear 11 and the output shaft 7 together. The front view of the transmitting member 10 is shown in FIG. 4A or 4B. Threaded holes 10b for the screw 10a are formed in the central portion of the transmitting member 10, and threaded holes 10c for the pivotally movable gear are formed in the outer peripheral portion of the transmitting member 10. The pivotally movable gear 11 and the threaded holes 10c are coupled together by screws, and the output shaft 7 and the threaded holes 10b are coupled together by screws. Arcuate hole portions 10d or semicircular hole portions 10e are formed among these threaded holes so as to permit bending deformation and prevent circumferential deformation.

This transmitting member 10 is formed of a resiliently deformable material such as a metal or synthetic resin.

The reference numeral 11 denotes a pivotally movable gear formed with a gear portion (the number of teeth $n_1$) approximate to a radial bevel gear or a bevel gear of triangular teeth or the like on one surface of the circular ring portion thereof. The pivotally movable gear 11 is fixed to the outer peripheral portion of the transmitting member 10. This pivotally movable gear 11 has the other surface 11a of its gear portion bearing against the outer peripheral surface of the radial bearing 4, and the other surface 11a is formed into an inclined surface to make its bearing against the radial bearing 4 good. The pivotally movable gear 11 is formed of an appropriate material such as a metal or synthetic resin.

The reference numeral 12 designates a circular ring-shaped fixed gear fixed to the casing lid 8 through an elastic material 13 such as polyurethane and formed with a gear portion (the number of teeth $n_2$) having a difference in the number of teeth from the gear portion of the pivotally movable gear 11, in opposed relationship with the gear portion of the pivotally movable gear 11. The gear portion of the pivotally movable gear 11 has some of its teeth brought into meshing engagement with the gear portion of the fixed gear 12 by the transmitting member 10 being resiliently deformed by a pressing mechanism constituted by the radial bearings 4, the support shaft 5 and the set screw 6. The elastic material 13 is fixed to the casing lid 8 by screwing, baking or an adhesive agent so as to bring the two gear portions into meshing engagement with each other without any backlash when the pivotally movable gear 11 is brought into meshing engagement with the fixed gear 12 by the pressing means.

In the present embodiment constructed as described above, when the rotary shaft 2a of the motor is rotated, the pressing means constituted by the radial bearings 4, etc. is also rotated with the rotary shaft 2a. The radial bearings 4 incline the gear 11 from behind it with respect to the output shaft and continuously press only one end portion thereof. Then, the teeth of the gear 11 is continuously brought into meshing engagement with the gear portion of the fixed gear 12 fixed to the casing 1 so as to describe a circular locus, just in such a manner as to pivotally move the pivotally movable gear 11 while resiliently deforming the transmitting member 10.

If the number of teeth $n_1$ of the pivotally movable gear 11 is e.g. 51 and the number of teeth $n_2$ of the fixed gear 12 is e.g. 50, when the pivotally movable gear 11 effects one full pivotal movement, it meshes excessively by an amount corresponding to the difference in the number of teeth because the difference thereof in the number of teeth from the fixed gear 12 is one tooth. That is, when the motor shaft 2a effects one full rotation, the pivotally movable gear 11 is rotated by 1/50. The transmitting member 10 connecting the pivotally movable gear 11 and the fixed gear 12 together absorbs the bending strain during pivotal movement by its resilient force and accurately transmits the rotation to the output shaft 7. Also, any backlash created by the allowable errors, the assembly adjustment, etc. of the parts constituting the transmission is eliminated by the action of the elastic material 13 interposed between the fixed gear 12 and the casing lid 8.

Figure 2:
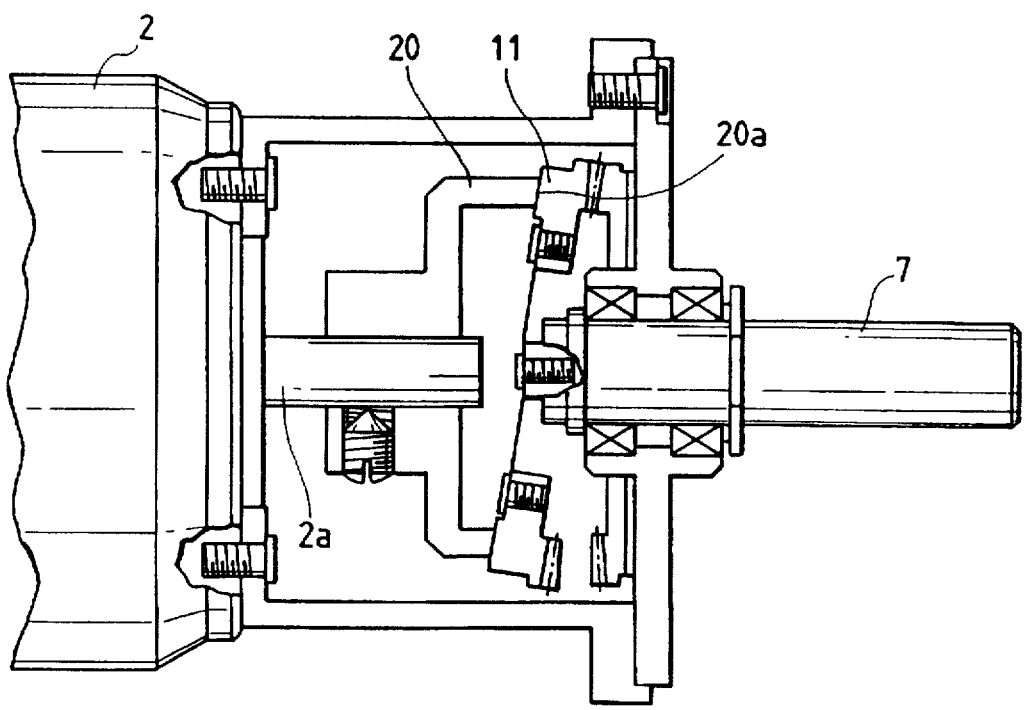
FIG. 2 shows a second embodiment of the speed reducer according to the present invention.

FIG. 2 shows a second embodiment of the present invention.

In the above-described first embodiment, the pressing means is constituted by the radial bearings 4, the support shaft 5 and the set screw 6, while in the present embodiment, a cylindrical pressing member 20 is fixed to the rotary shaft 2a of the motor, the open end surface 20a of this pressing member 20 is formed into the shape of an obliquely cut end and is made to bear against the other surface side of the pivotally movable gear 11 so as to sequentially mesh with a part of the gear portion of the fixed gear 12.

A thrust bearing may be provided on the open end surface 20a of the pressing member 20 so as to make the sliding resistance with respect to the fixed gear 12 small.

Also, the pressing member 20 and the pivotally movable gear 11 may be formed of metals or different materials, for example, a metal and synthetic resin, for the prevention of baking, for high torque speed change, and a combination of synthetic resins for low torque speed change, that is, appropriate materials in conformity with the purpose of use.

Further, in the above-described first and second embodiments, the input rotor including the pressing means has its rotational balance kept by a balancer or the like, not shown.

Figure 3:
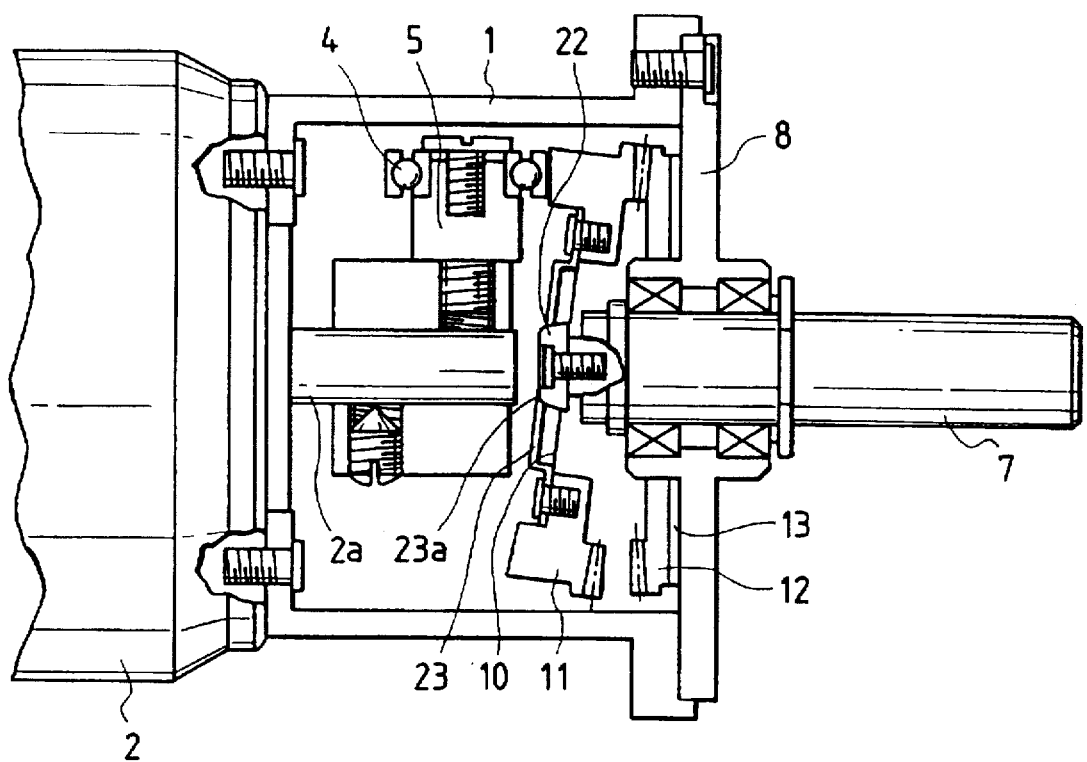
FIG. 3 shows a third embodiment of the speed reducer according to the present invention.

FIG. 3 shows a third embodiment of the present invention.

In the above-described first and second embodiments, the pivotally movable gear 11 effects pivotal movement sequentially for tilting by only the resilient force of the transmitting member 10, while in the present embodiment, a hemispherical piece portion 22 is formed on one end portion of the output shaft 7, and a receiving member 23 having a hole portion 23a fitting to this hemispherical piece portion 22 is fixed to the pivotally movable gear 11.

Accordingly, the above-mentioned pivotal movement of the pivotally movable gear 11 is regulated by the receiving member 23 fitting to the hemispherical piece portion 22 and thus, stable pivotal movement is obtained.

In the above-described embodiments, the radial bearings 4 and the pressing member 20 are used for the pressing means, whereas the present invention is not restricted thereto, but a ball or the like may be used.

Also, screws are used for the coupling of the members constituting the transmission, but when mass productivity is taken into consideration, they may be formed by integral molding, insert coupling or the like by the use of a molding method.

Figure 7:
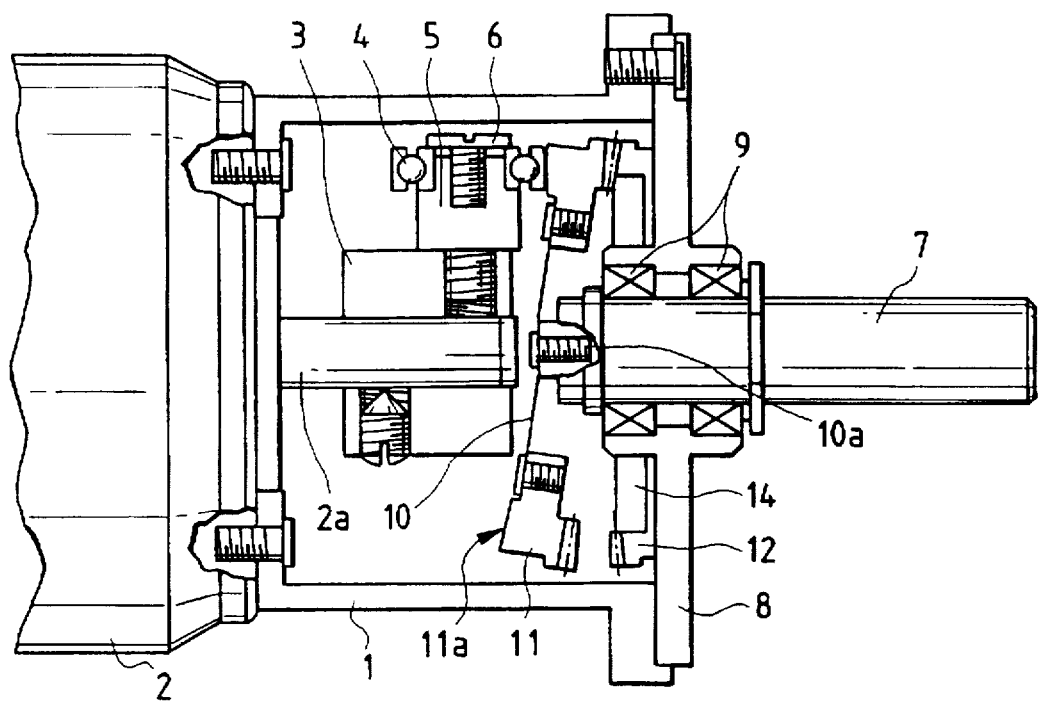
FIG. 7 shows a speed reducer improved over the speed reducer of FIG. 1.
Figure 8:
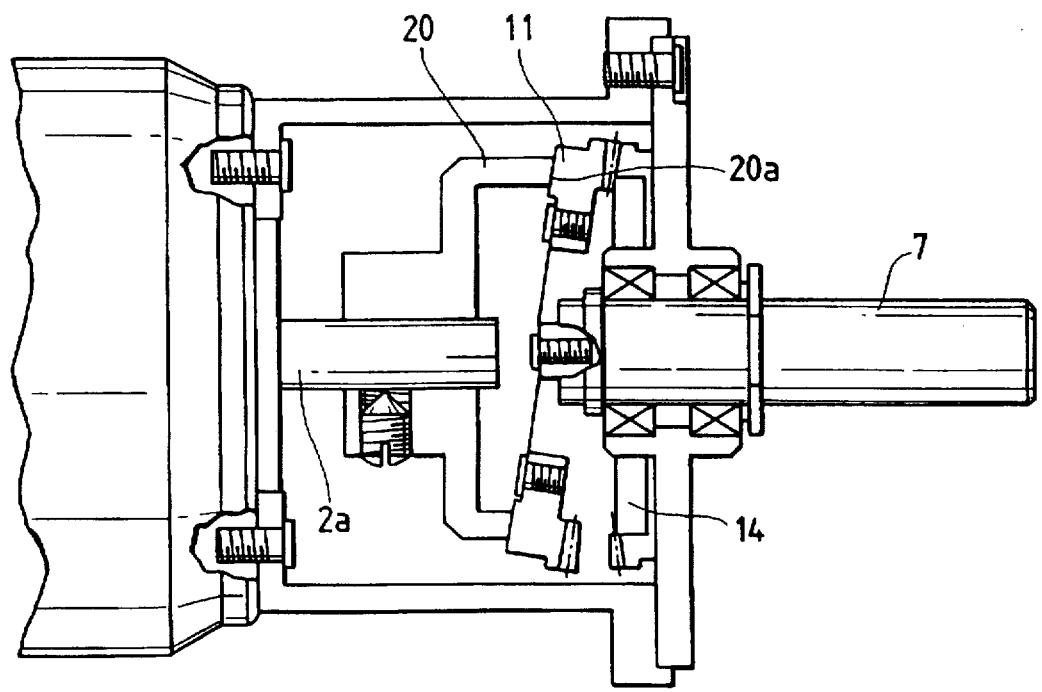
FIG. 8 shows a speed reducer improved over the speed reducer of FIG. 2.
Figure 9:
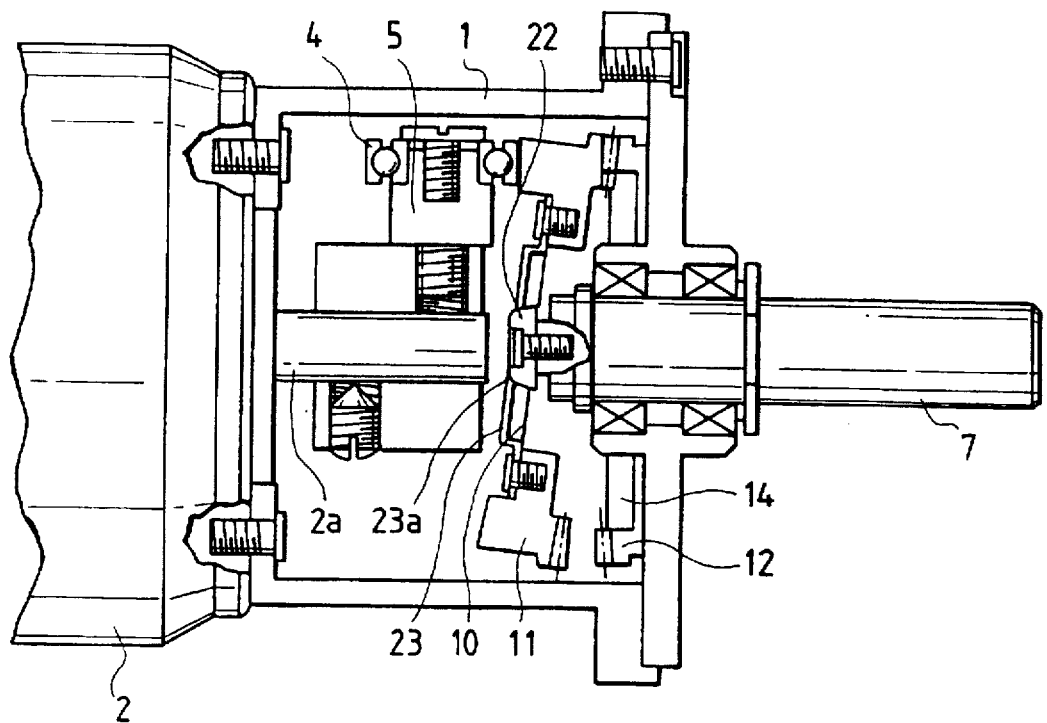
FIG. 9 shows a speed reducer improved over the speed reducer of FIG. 3.

Embodiments improved over the aforedescribed embodiments will now be described with reference to FIGS. 7 to 9. Only the differences of these improved embodiments from the previous embodiments will be described here. These improved embodiments differ from the previous embodiments in that the disposition of an elastic member 14 is elaborately contrived. The elastic member 14 is formed of an elastic material such as rubber or polyurethane and is adapted to bear directly against a part of the gear 11.

Accordingly, the pivotally movable gear 11 meshes with the fixed gear 12 and also bears against the bearing portion of the elastic member 14 to thereby elastically deform the elastic member 14 and therefore, any backlash between the two gears is absorbed and the creation of vibration and noise can be reduced.

Figure 10:
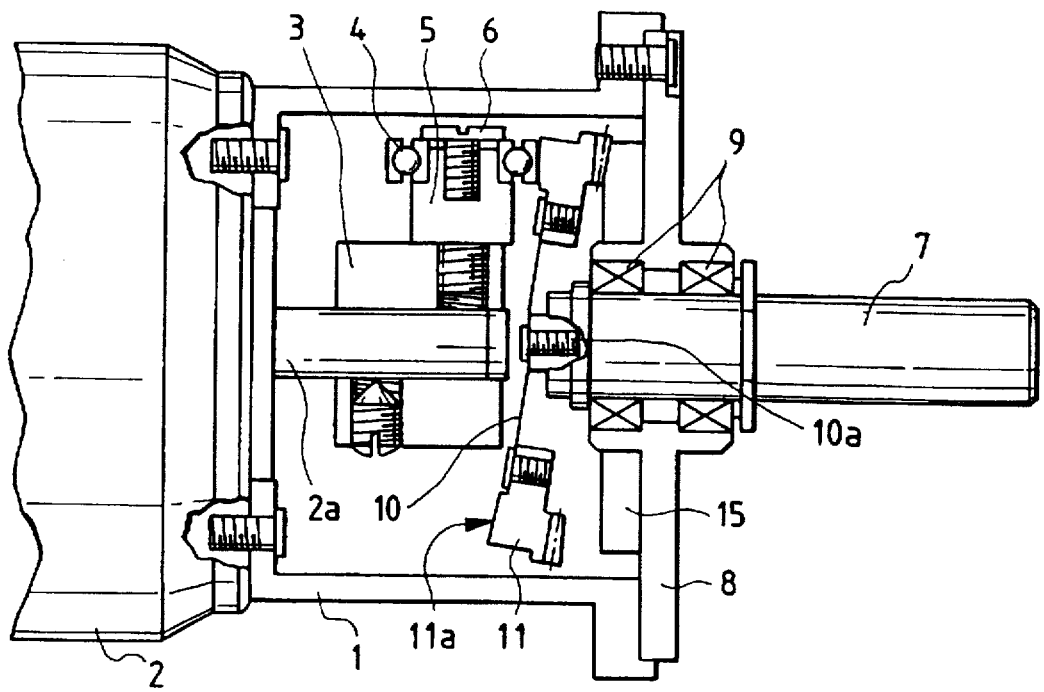
FIG. 10 shows a speed reducer improved over the speed reducer of FIG. 1.
Figure 11:
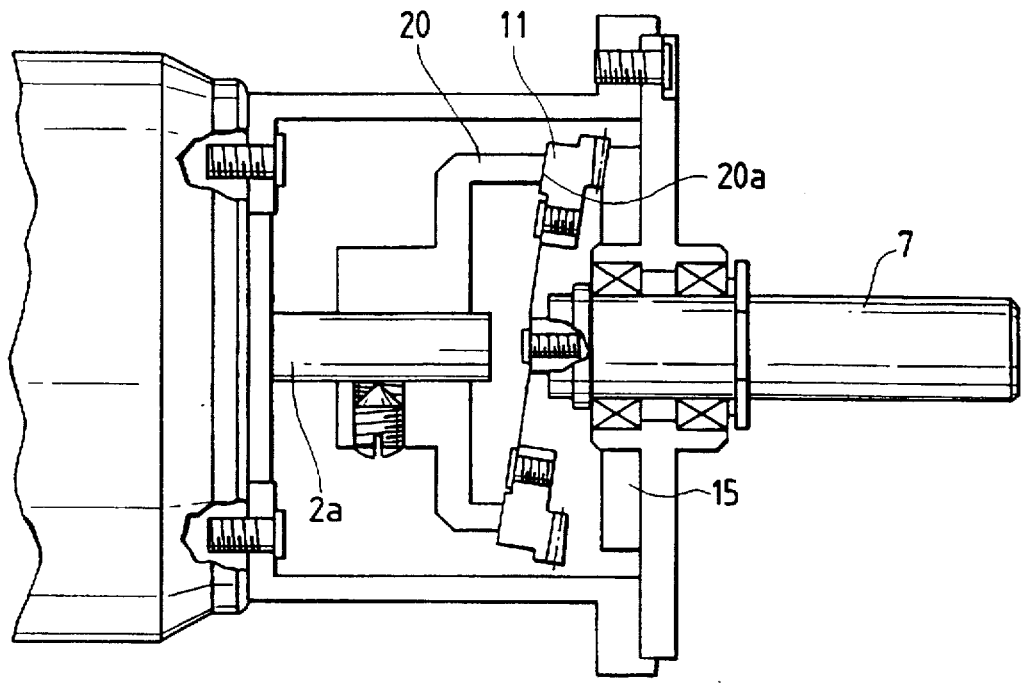
FIG. 11 shows a speed reducer improved over the speed reducer of FIG. 2.
Figure 12:
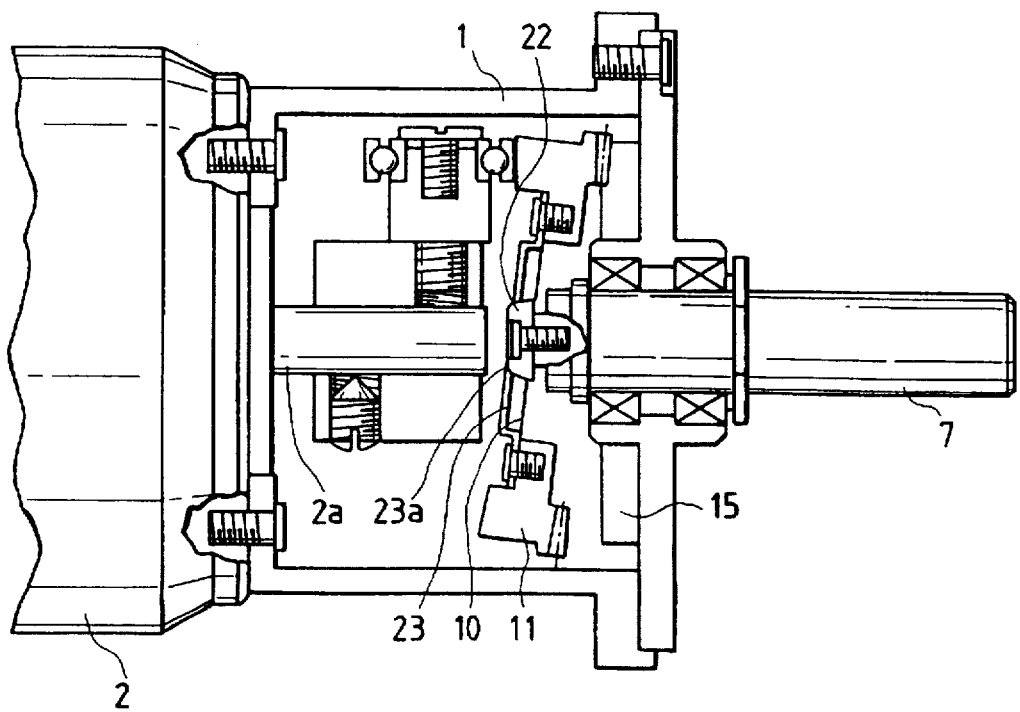
FIG. 12 shows a speed reducer improved over the speed reducer of FIG. 3.

Further modifications are shown in FIGS. 10 to 12. The description of the same portions as those in the previous embodiments will be omitted and only the differences of the modifications from the previous embodiments will be described.

The reference numeral 15 designates a circular ring-shaped fixed gear formed of an elastic material such as rubber or polyurethane and fixed to the casing lid 8 as by baking or an adhesive agent. This fixed gear 15 is formed with a gear portion (the number of teeth $n_2$) opposed to the gear portion of the pivotally movable gear 11 and having a difference in the number of teeth from the gear portion of the pivotally movable gear 11. The gear portion of the pivotally movable gear 11 resiliently deforms the transmitting member 10 relative to the gear portion of the fixed gear 12 by a pressing mechanism constituted by the radial bearings 4, the support shaft 5 and the set screw 6 and some of the teeth thereof are in meshing engagement with the gear portion of the fixed gear 12. By this fixed gear being formed of an elastic material, the gear portions of both gears may be brought into meshing engagement with each other without any backlash when the pivotally movable gear 11 is brought into meshing engagement with the fixed gear 12 by the pressing means. The pivotally movable gear 11 may be formed of an elastic material such as rubber or polyurethane or formed by an O-ring or the like to obtain a similar effect.

Thus, any backlash caused by the allowable errors, the assembly adjustment, etc. of the parts constituting the transmission is absorbed by the elastic deformation of the fixed gear 12 formed of an elastic material in the direction of thickness thereof and thereby, the creation of vibration and noise is also reduced.

Embodiments further improved will now be described with reference to FIGS. 13 to 15.

In each of the above-described embodiments, there has been disclosed an apparatus in which a high speed change ratio is obtained by the meshing engagement between the gears or by the contact between the gear and the elastic member.

What will hereinafter be described is an apparatus in which the two are brought into frictional contact with each other to thereby obtain a high speed change ratio. The description of the same portions as those in the previous embodiments will be omitted, and only different portions will be described.

Figure 13:
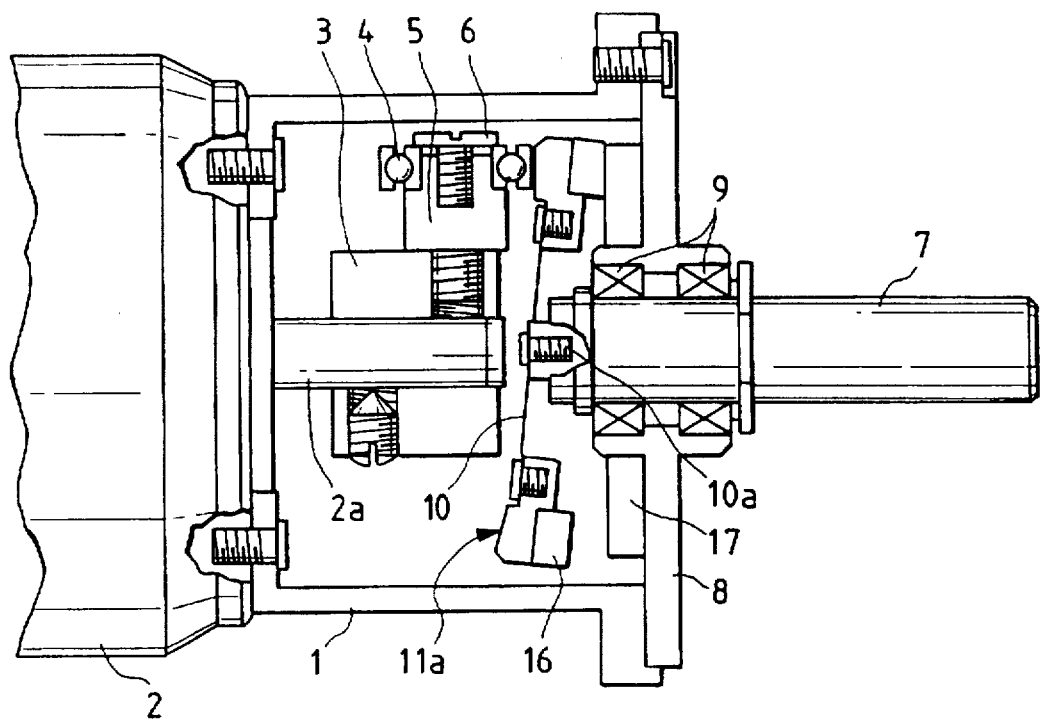
FIG. 13 shows a speed reducer improved over the speed reducer of FIG. 1.
Figure 14:
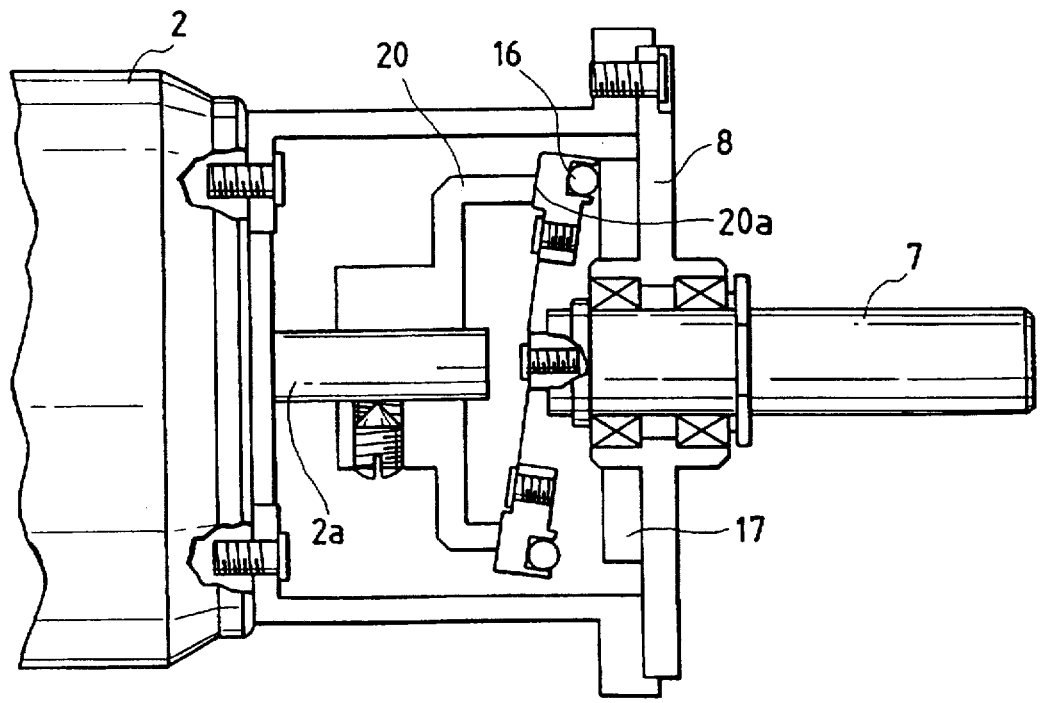
FIG. 14 shows a speed reducer improved over the speed reducer of FIG. 2.
Figure 15:
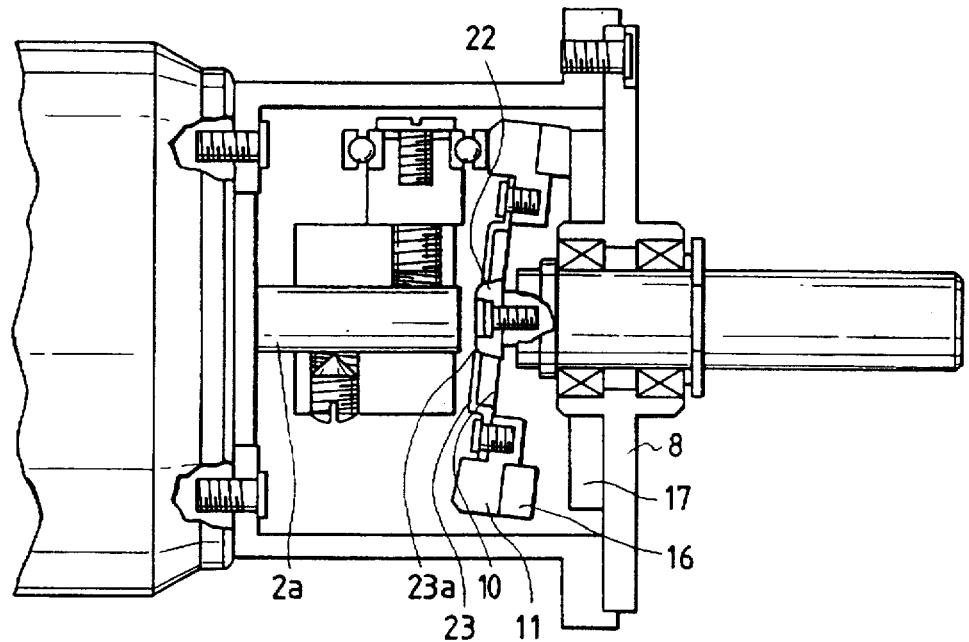
FIG. 15 shows a speed reducer improved over the speed reducer of FIG. 3.

In FIGS. 13 and 15, the reference character 11a denotes a pivotally movable member having a ring-shaped friction member 16 formed of an elastic material such as rubber or polyurethane and fixed to a circular ring-shaped casing portion as by baking or an adhesive agent. The back side of the casing bears against the outer peripheral surface of the radial bearings 4 as and is formed into an inclined surface so as to be capable of bearing against the radial bearings 4 as well.

The reference numeral 17 designates a circular ring-shaped fixed portion formed of an elastic material such as rubber or polyurethane and fixed to the casing lid 8 as by baking or an adhesive agent. This fixed portion 17 is opposed to the friction member 16 and differs in the length of contact with the friction member 16. The friction member 16 resiliently deforms the transmitting member 10 relative to the fixed portion 17 by the pressing mechanism constituted by the radial bearings 4, the support shaft 5 and the set screw 6, and a portion thereof is in frictional contact with the fixed portion 12.

In the present embodiment constructed as described above, when the rotary shaft 2a of the motor body 2 is rotated, the pressing means constituted by the radial bearings 4, etc. is also rotated with the rotary shaft 2a. The radial bearings 4 bring the friction member 16 into frictional contact with the fixed portion 17 fixed to the casing, just in such a manner as to pivotally move the friction member 16 while pressing the end portion of the friction member 16 to thereby resiliently deform the transmitting member 10. When the rotary shaft 2a effects one full rotation, the pivotally movable member 11a is rotated by an amount corresponding to the above-mentioned difference in the length of contact.

Description will now be made of an embodiment in which the basic principle of the speed reducer is the same as that of the previous embodiments, but the mechanism is made to somewhat differ from that of the previous embodiments.

Figure 16:
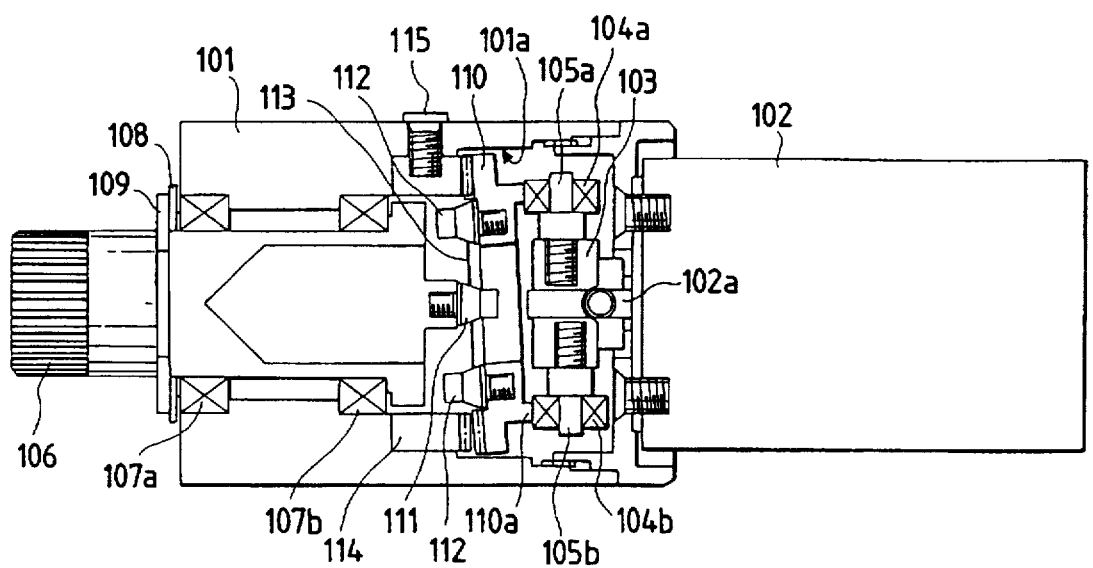
FIG. 16 shows another form of the present invention.
Figure 17:
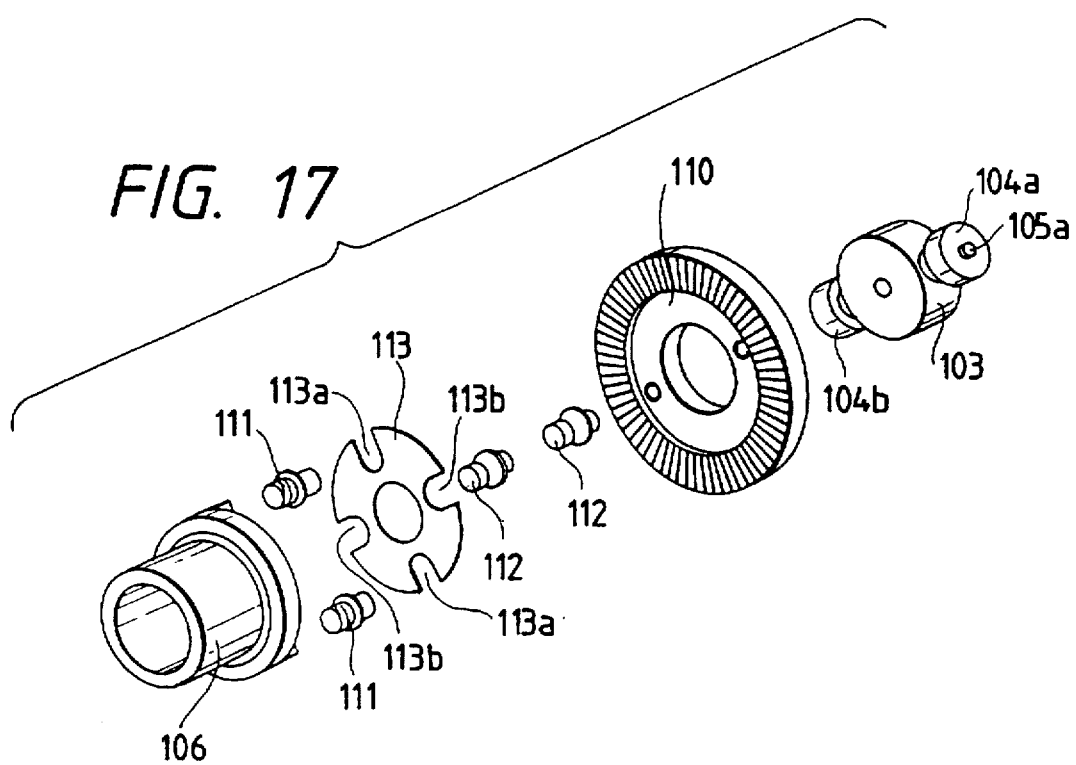
FIG. 17 is an exploded perspective view of the essential portions of FIG. 16.

FIGS. 16 and 17 show another form of the transmission.

The reference numeral 101 designates the casing of the transmission of which one end side is fixed to a motor 102 by screws and from the other end of which the tip end portion of an output shaft 106 protrudes. The output shaft 106 is rotatably supported in this casing 101 by a first radial bearing 107a and a second radial bearing 107b, a fixed gear 114 has its toothed portion fixed toward the motor 102 side by a mounting screw 115, the output shaft 106 and the fixed gear 114 are mounted so that the axes thereof may both coincide with the axis of the rotary shaft 102a of the motor 102, and a regulating portion 101a formed by an inner wall surface for limiting the amount of eccentricity resulting from the pivotal movement of a pivotally movable gear 110 which will be described later is likewise coaxially formed. The output shaft 106 is subjected to anti-slippage by an anti-slippage E-shaped ring 109 mounted on the protruding end side with backlash adjusting spacers 108 interposed therebetween.

The rotary shaft (input shaft) 102a of the motor body 102 is inserted in the casing 101 and a rotor 103 is fixed to the tip end portion of the rotary shaft 102a by screws. The rotor 103 may be fixed to the rotary shaft 102a by a press-in method or an adhesively securing method. Diametrally of this rotor 103, a first support shaft 105a and a second support shaft 105b are fixed in a direction orthogonal to the rotary shaft 102a.

On the other hand, the first support shaft 105a and the second support shaft 105b form a straight line in the diametral direction, but have a deviation of a distance d in the axial direction (thrust direction) thereof. A first pressing roller 104a and a second pressing roller 104b of equal diameters constituted by radial bearings are rotatably mounted on the tip end portions of the first support shaft 105a and the second support shaft 105b, respectively, and the rotor 103, the pressing rollers 104a, 104b and the support shafts 105 together constitute a pressing mechanism for pressing a portion of the pivotally movable gear 110 which will be described later against the fixed gear 114. The adjustment of rotational balance for stabilizing the rotation of the pressing mechanism so that no unbalance may occur to the rotation of the pressing mechanism is effected by the aforementioned deviation.

This amount of deviation d is set in conformity with the inclination required to sequentially bring a portion of the pivotally movable gear 110 into meshing engagement with the gear portion of the fixed gear 114. That is, the first pressing roller 104a is positioned more adjacent to the pivotally movable gear 110 than the second pressing roller 104b and therefore, the pivotally movable gear 110 becomes inclined with respect to the rotary shaft 102a when it bears against the first pressing roller 104a and the second pressing roller 104b. The above-mentioned amount of deviation d may be zero and a difference of the amount of deviation d may be provided between the diameters of the first pressing roller 104a and the second pressing roller 104b. The pivotally movable gear 110 is formed with a ring-like protrusion 110a having an inclined surface against which the pressing rollers 104a and 104b bear formed on the back side thereof opposed to the pressing rollers 104a and 104b, whereby good bearing against these pressing rollers 104a and 104b is ensured.

The pivotally movable gear 110 is formed with a gear portion (the number of teeth $n_1$) approximate to a radial bevel gear or a bevel gear such as triangular teeth on one surface of a circular ring-shaped gear body, as shown in FIG. 17, and is formed of an appropriate material such as a metal or synthetic resin.

Also, the pivotally movable gear 110 is mounted on the output shaft 106 through a joint mechanism having the aligning function. This joint mechanism is designed to be capable of transmitting the rotation of the pivotally movable gear 110 to the output shaft 106, and in the present embodiment, it is constituted by a disc-shaped transmitting member 113 formed by a springy thin plate, a pair of first connecting pins 111 engaged with the transmitting member 113 and provided on the output shaft, and a pair of second connecting pins 112 provided on the gear 110. In the outer peripheral portion of the transmitting member 113, U-shaped grooves 113a and 113b are formed at intervals of 90° diametrally thereof, the first connecting pins 111 are engaged with the pair of opposed U-shaped grooves 113a, the second connecting pins 112 are engaged with the other pair of opposed U-shaped grooves 113b. The portions of engagement of the first connecting pins 111 and the second connecting pins 112 with the U-shaped grooves are formed into a tapered shape, and by the action of the tapered surfaces of these portions of engagement, the transmitting member 113 can pivotally move in the direction linking the U-shaped grooves together, without any backlash. That is, the pair of first connecting pins 111 constituting the joint mechanism are fixed to the pivotally movable gear 110, the pair of second connecting pin 112 are fixed to the output shaft 106, and the tapered portions of each pair of connecting pins are designed to press the transmitting member 113 from the front and back surfaces thereof and resiliently deform it, whereby any backlash between each connecting pin and each U-shaped groove in the direction of rotation of the output shaft can be eliminated.

Accordingly, even if the pivotally movable gear 110 rotates while pivotally moving, the inclination thereof by the pivotal movement is permitted by the inclination by the pivotal movement of the transmitting member 113, and by the rigidity of the transmitting member 113 in the direction of rotation thereof, the rotation of the pivotally movable gear 110 is transmitted to the output shaft 106 through the first connecting pins 111 and the second connecting pins 112. The transmitting member 113 is formed with U-shaped grooves engaged by the tapered portions of the connecting pins 111 and 112, but alternatively, slots may be formed instead of the U-shaped grooves.

The fixed gear 114 is formed into a circular ring-like shape and is formed with a gear portion (the number of teeth $n_2$) having a difference in the number of teeth from the gear portion of the pivotally movable gear 110, and is adapted to be meshed with by a portion of the pivotally movable gear 110 pressed by the above-described pressing mechanism.

In the present embodiment constructed as described above, when the rotary shaft 102a of the motor is rotated, the pressing mechanism constituted by the pressing rollers 104a, 104b, etc. is also rotated with the rotary shaft 102a.

The pressing rollers 104a, 104b then presses the ring-shaped protrusion 110a of the pivotally movable gear 110 from behind it. The first pressing roller 104a (the pressing portion) is positioned more adjacent to the pivotally movable gear 110 than the second pressing roller 104b (the bearing portion) and thus, the pivotally movable gear 110 is inclined and pivotally moved about the axis of the output shaft 106, and the gear portion of the portion pushed by the first pressing roller 104a meshes with the gear portion of the fixed gear 114. At that time, the second pressing roller 104b also bears against the protruded portion of the pivotally movable gear 110 and therefore, the vibration of the pivotally movable gear 110 is suppressed and rotation free of noise and vibration is obtained.

This meshing position moves with the rotation of the first pressing roller 104a and at that time, the absorption of the axial deviation and inclination during pivotal movement is accomplished by the aligning movement created by the resilient deformation of the joint mechanism and the action of the tapered surfaces of the flange portions of the connecting pins 111 and 112 and thus, the accurate pivotal movement of the pivotally movable gear 110 is ensured and the rotation thereof is accurately transmitted to the output shaft 110 and also, any backlash is absorbed.

If the number of teeth n1 of the pivotally movable gear 110 is 51 and the number of teeth n2 of the fixed gear 114 is 50, when the pivotally movable gear 110 effects one full rotation, it meshes with the fixed gear 114 excessively by an amount of the difference in the number of teeth because the difference thereof in the number of teeth from the fixed gear 114 is one tooth. That is, when the motor shaft 102a effects one full rotation, the pivotally movable gear 110 is rotated by ⅕₀. While the connecting pins 111 and 112 are formed with tapered portions, the connecting pins may be formed straight and an engagement portion having its inner periphery formed in a tapered shape may be formed on the slot or U-shaped groove side of the transmitting member 113.

Figure 18A:
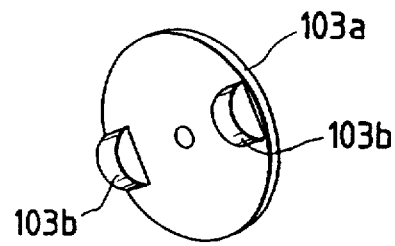
FIGS. 18A and 18B are perspective views showing a modification of the connecting member.

While in the present embodiment, the pressing rollers constituted by radial bearings are used as the pressing means of the pressing mechanism, rollers formed of resin or like material may also be used, and as shown in FIG. 18A, a pair of semicylindrical protruded portions 103b may be formed on a disc-shaped rotatable member 103a or hemispherical protruded portions may be formed thereon, and it is desirable that a material having a small coefficient of friction and good wear resistance be used for these protruded portions.

Figure 18B:
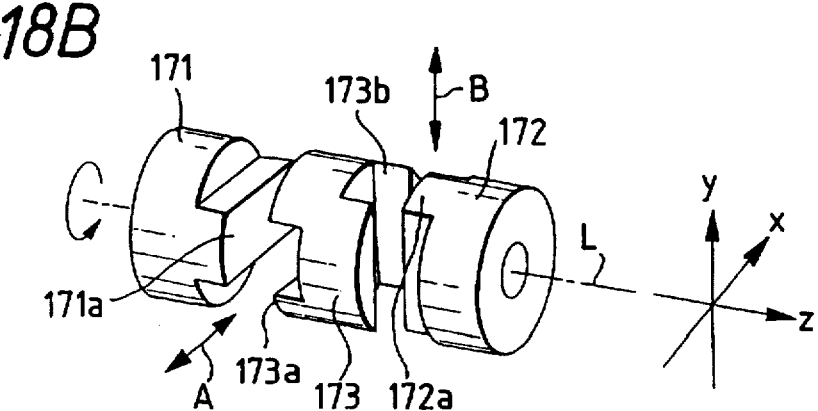

Also, as the joint mechanism, use may be made of a rotary two-slider mechanism as shown in FIG. 18B.

This rotary two-slider mechanism is constituted by an input hub 171 fixed to the pivotally movable gear 110, an output hub 172 fixed to the output shaft 106, and a spacer 173 engaged with the input hub 171 and the output hub 172, the input hub 171 and the output hub 172 having a first I-shaped projection 171a and a second I-shaped projection 172a, respectively, protruded on the opposed surfaces thereof in a direction orthogonal to a rotational axis L, and the spacer 173 being formed into a disc-like shape and having a first engagement groove 173a and a second engagement groove 173b formed back to back and orthogonal to the rotational axis L and orthogonal to each other. The first projection 171a of the input hub 171 is in engagement with the first engagement groove 173a and the second projection 172a of the output hub 172 is in engagement with the second engagement groove 173b.

In the joint mechanism of such construction, the input hub 171 and the spacer 173 slip relative to each other in the direction of arrow A, and the spacer 173 and the output hub 172 slip relative to each other in the direction of arrow B. The input hub 171 is fixed to the pivotally movable gear 110, but it is permitted to pivotally move about the x-axis and pivotally move about the y-axis and thus, the rotation of the pivotally movable gear 110 is stably transmitted to the output shaft 106.

The tooth shapes of the pivotally movable gear 110 and the fixed gear 114 can be realized by making the angle of pivotal movement small particularly when in a high speed reducer, the pivotally movable gear 110 rotates at a high speed or when quiet rotation is necessary, and rounding, for example, the diameter of the tip circle of a standard gear by the order of about ⅓ of the difference between the diameter of the tip circle and the diameter of the pitch circle to decrease the vibration in the thrust direction to the utmost. Also, although not particularly shown, to suppress the vibration by the pivotal movement of the pivotally movable gear 110 to the utmost when the output shaft 106 is mounted in the casing 101, it is desirable to widen the spacing between the bearings 107a and 107b, and the suppression of the vibration can be realized, for example, by providing one side of the bearing 107a in the casing 101 and the other side outside the speed reducer, and further providing transmitting means such as a gear between the bearings so that the output may be taken out of the transmitting means.

Figure 19:
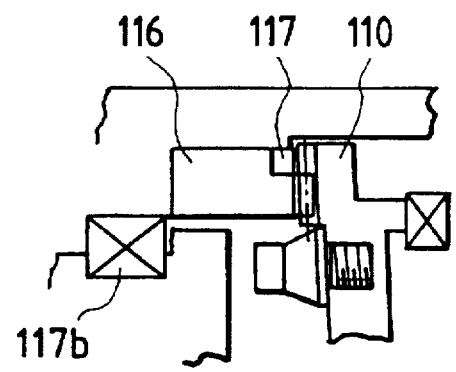
FIG. 19 shows the essential portions of a speed reducer improved over the speed reducer of FIG. 16.

FIG. 19 shows an improved embodiment.

This embodiment is one in which an elastic material 117 such as rubber or polyurethane is fixed to a part of the toothed portion of the fixed gear 116 meshing with the pivotally movable gear 110, by baking or an adhesive agent. Of course, an elastic material such as rubber or polyurethane may be provided on a portion of the pivotally movable gear 110.

In the present embodiment, when the pivotally movable gear 110 is to be brought into meshing engagement with the fixed gear 116 by the pressing mechanism, the toothed portion of the pivotally movable gear 110 meshes with the toothed portion of the fixed gear 116, and on the other hand, the pivotally movable gear 110 also bears against the bearing portion of the elastic material 117 and elastically deforms the elastic material 117 and therefore, any backlash between the two gears can be absorbed and also, the creation of vibration and noise can be reduced. The gear-bearing surface of the elastic material 117 is substantially formed into the shape of a bevel gear, a triangular tooth, a flat surface or the like.

Figure 20:
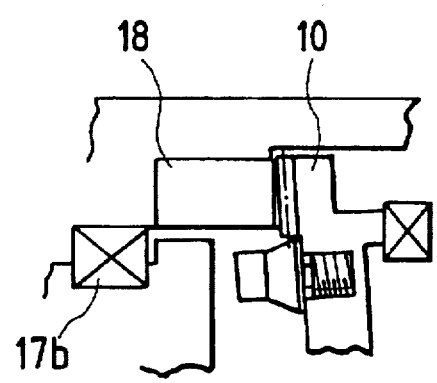
FIG. 20 shows the essential portions of a speed reducer improved over the speed reducer of FIG. 16.

FIG. 20 shows another improved embodiment.

This embodiment is one in which one of the fixed gear and the pivotally movable gear is formed of an elastic material such as rubber or polyurethane, and in FIG. 20, the fixed gear 118 is formed of the elastic material, and the circular ring-shaped fixed gear 118 is fixed to a casing 101 as by baking or an adhesive.

In the present embodiment, when the pivotally movable gear 110 is to be brought into meshing engagement with the fixed gear 118 by a pressing mechanism (the same mechanism as the pressing mechanism in the embodiment shown in FIG. 16), any backlash between the two gears can be absorbed and the creation of vibration and noise can be reduced. The pivotally movable gear may be formed of an elastic material and further, it is desirable that the bearing surface of the elastic gear be substantially formed into the shape of a bevel gear, a triangular tooth or simply a flat surface or the like.

Figure 21:
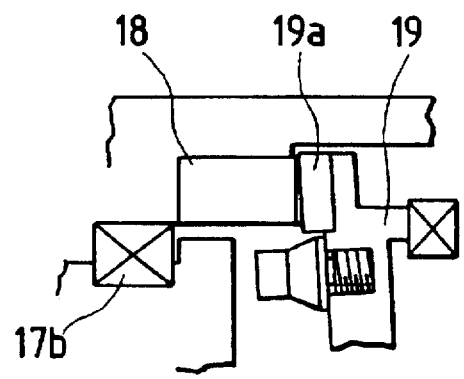
FIG. 21 shows the essential portions of a speed reducer improved over the speed reducer of FIG. 16.

FIG. 21 shows still another improved embodiment.

In this embodiment, the fixed gear 118 is formed of an elastic material, while the pivotally movable gear has its toothed portion 119a formed of an elastic material such as rubber or polyurethane, and this toothed portion 119a is fixed to the pivotally movable member 119 by baking or an adhesively securing method.

According to the present embodiment, when the pivotally movable gear is to be brought into meshing engagement with the fixed gear 118 by a pressing mechanism (the same mechanism as the pressing mechanism in the embodiment shown in FIG. 16), any backlash between the two gears can be absorbed and the creation of vibration and noise can be reduced. It is desirable that the bearing surface of the elastic gear be substantially formed into the shape of a bevel gear, a triangular tooth or simply a flat surface or the like.

Figure 22:
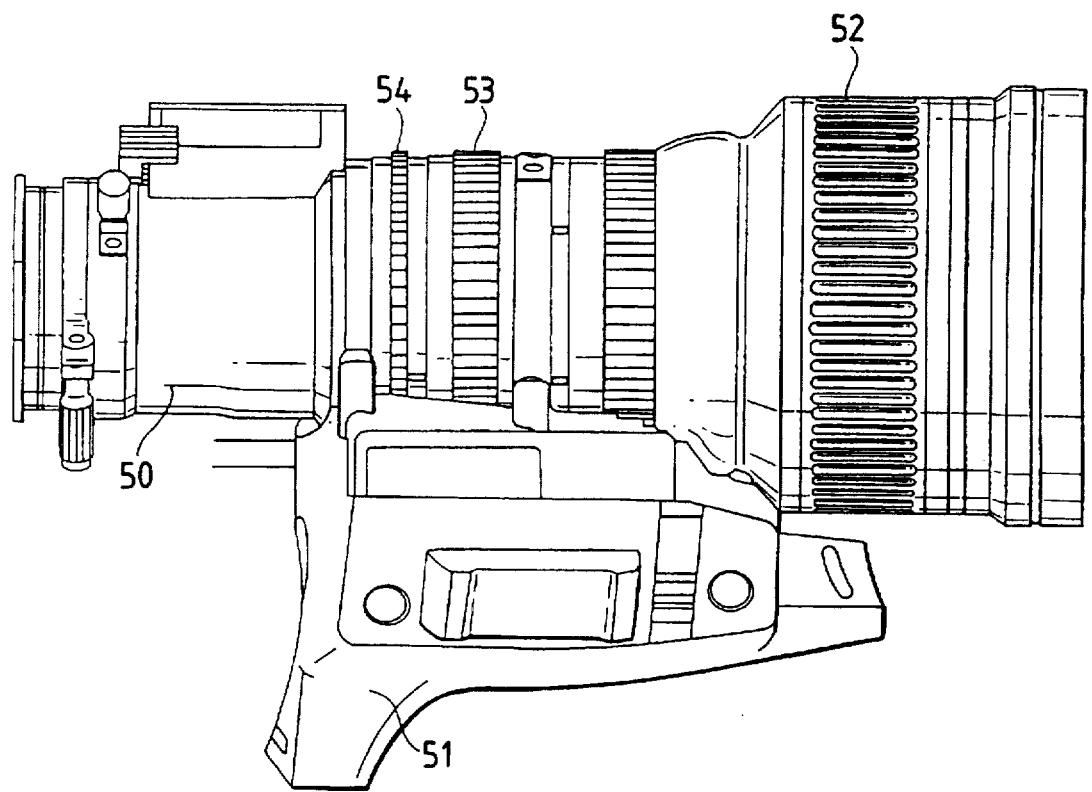
FIG. 22 shows a lens barrel carrying the apparatus of the present invention thereon.
Figure 23:
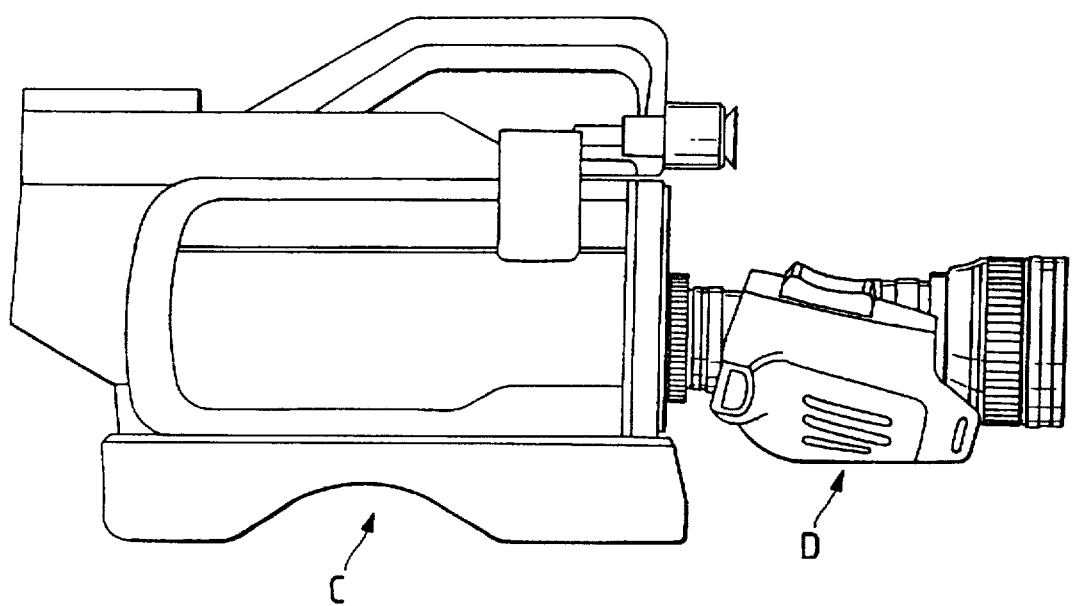
FIG. 23 shows a TV camera carrying the apparatus of the present invention thereon.

FIGS. 22 to 26 show the transmission according to the present invention as it is used in a driving mechanism for lens driving such as the focusing or zooming of a photo-taking lens which is an optical device or the driving of the iris or the like, and the photo-taking lens D mounted on a TV camera C as shown in FIG. 23 is shown in FIG. 22.

In FIG. 22, the reference numeral 50 designates a lens body, the reference numeral 51 denotes a driving unit, the reference numeral 52 designates a focus ring, the reference numeral 53 denotes a zoom lens and the reference numeral 54 designates an iris ring. The output gear of a driving device, not shown, meshes with a toothed portion formed on the outer peripheries of these rings to thereby transmit a rotational output.

Figure 24:
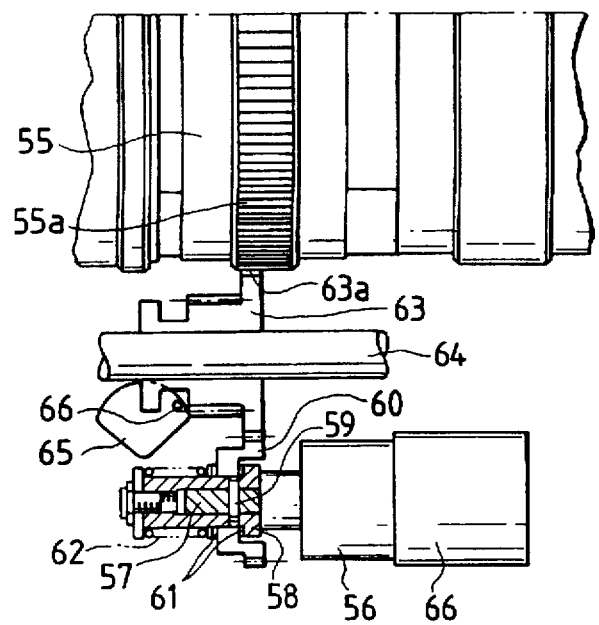
FIG. 24 is a cross-sectional view of a driving device showing the electrically driven state thereof.
Figure 25:
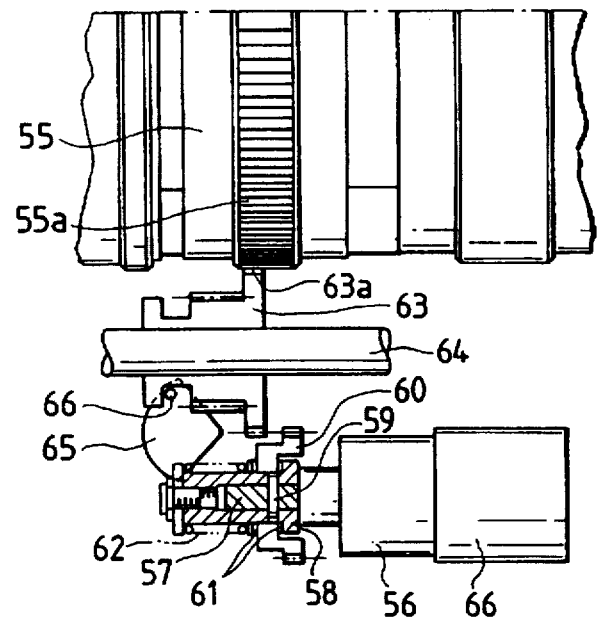
FIG. 25 is a cross-sectional view of the driving device showing the manually driven state thereof.

FIGS. 24 and 25 show a zooming power transmitting device in the driving device of FIG. 22, FIG. 24 representing a power transmitting path when the lens is driven for transmission, and FIG. 25 showing a case where an operating ring is manually driven.

In FIG. 24, the other members than a lens barrel and the operating ring are contained in the driving unit.

In these figures, the reference numeral 55 designates a lens operating ring on the outer peripheral surface of which are formed meshing teeth 55a in the circumferential direction. A stepped sleeve 58 is mounted on an output shaft 57 extending from the case of a transmission 56 integral with a motor 66, and the sleeve 58 is fixed to the output shaft 57 as by a pin 59 so that the sleeve 58 may be rotated with the output shaft 57.

The reference numeral 60 denotes the output gear of the transmission 56. The output gear 60 is mounted for rotation relative to the sleeve 58 and is normally urged toward the motor 66 side by a spring 62 through a slidable washer 61. In this construction, under a predetermined load torque, the output gear 60 of the transmission 56 and the output shaft 57 of the transmission 56 rotate as a unit, but when the load torque is excessively great, they slip relative to the sleeve 58 of the transmission 56 and play the role of a torque limiter which alleviates the force acting on the tooth surface to thereby prevent the teeth from being damaged.

This torque limiter mechanism is effective to absorb any impact force applied to the tooth surface during stoppage particularly when the lens is driven to its operative end at a high speed.

The reference numeral 63 designates an intermediate gear positioned intermediately of the output gear 60 of the transmission 56 and the operating ring 55. The intermediate gear 63 is rotatable relative to a shaft 64 and at the same time, is slidable on the shaft. Meshing teeth 63a on the outer peripheral surface of the intermediate gear 63 are in engagement with both of the output gear 60 of the transmission 56 and the operating ring 55. When under such a power transmitting mechanism, a cameraman operates a predetermined operating switch provided on the driving unit, rotational power created from the motor 66 is transmitted to the operating ring 55 through the output gear 60 of the transmission 56 and the intermediate gear 63, whereby the lens is electrically driven.

FIG. 24 shows a case where the operating ring is manually driven. In this case, when the cameraman operates a clutch lever, not shown, a clutch plate 65 is rotated. On the other hand, a changeover pin 66 studded in the clutch plate 65 is in engagement with the intermediate gear 63 and therefore, with the operation of the clutch lever, the intermediate gear 63 slides on the shaft 64 and comes out of the meshing engagement with the output gear 60 of the transmission. When the lens is to be manually operated, the changeover lever is operated in such a manner to thereby interrupt the power transmitting path to the drive motor and the operating ring is directly manually operated or a lever attached on the operating ring is operated to thereby drive the lens.

As described above, the present embodiment adopts a system in which when electrical driving and manual driving are to be selectively changed over, the position of the intermediate gear positioned intermediately of the output gear 60 of the transmission 56 and the operating ring 55 and meshing with these two is displaced to thereby bring the meshing teeth into and out of engagement with each other, and it is usual that the meshing teeth in this case are provided on the outer peripheral surfaces as typified by spur gears.

Further, the power transmitting member transmitting the power by the meshing engagement between the teeth and the torque limiter member limiting the transmitted torque to thereby prevent any damage of the tooth surface during overload rotation are independently provided as discrete members in the power transmitting mechanism connecting the motor and the lens operating ring together.

In the present embodiment, by the transmission of the present invention being used, it becomes possible to obtain a rotational output free of backlash and moreover, the noise intercepting and vibration suppressing effects are obtained, and the responsiveness during focusing, zooming and the operation of the iris or the like becomes good and moreover, smooth movement free of twitching is obtained during rise.

Figure 26:
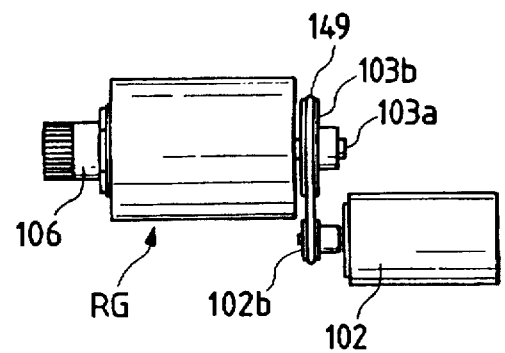
FIG. 26 is a side view showing another form embodying the present invention.

FIG. 26 shows a further embodiment.

In each of the above-described embodiments, the transmission and the motor 102 are mounted integrally with each other and the rotary shaft 102a of the motor 102 is directly connected to the rotor 103 of the transmission. But in the present embodiment, the motor 102 and the transmission RG are provided discretely from each other so that the rotation of the motor 102 may be decelerated by a speed reducing mechanism provided with a power transmitting member 149 such as a rubber ring or a timing belt between a pulley 103b provided on the rotor shaft 103a of the rotor 103 and a pulley 102b provided on the rotary shaft 102a of the motor 102 and may be transmitted to the transmission RG.

According to the present embodiment, the rotation of the rotor 103 can be further reduced and the creation of sliding sound resulting from the speed changing operation can be suppressed, and a speed changing operation suffering very little from noise, vibration and irregularity of rotation can be performed.

While in each of the above-described embodiments, the fixed gear 114 and the pivotally movable gear 110 are used as speed change differential members, a friction disc may be used as the speed change differential member so that the deviation of the bearing position for frictional rotation may be taken out as a speed change output.

Without first and second speed change differential members themselves being deformed, a portion of the second speed change differential member can be made to sequentially mesh with or bear against the first speed change differential member to thereby realize high speed reduction.

Particularly, for example, the gears themselves forming the first and second speed change differential members are not elastically deformed and therefore, the present embodiment can also be applied to speed change of a high torque and is good in transmission efficiency and can obtain a high speed reduction ratio by a single stage with transmission efficiency approximate to that of a spur gear and thus, the downsizing and simplification of the transmission itself can be achieved. Also, the number of parts can be reduced and assembly becomes easy and thus, inexpensive manufacture becomes possible.

Also, in the transmission of the present invention, the construction of the joint means can be simplified.

According to another form of the present invention, the creation of any backlash can be prevented.

According to the present invention, the excessive eccentricity of the second speed change differential member can be suppressed and pivotal movement within a proper range can be ensured.

According to the present invention, the accurate pivotal movement of the second speed change differential member can be accomplished and a speed changing operation free of noise and vibration can be performed.

Thus, according to another form of the present invention, the downsizing of a driving apparatus having this transmission becomes possible and for example, an object to be driven can be driven without any backlash and at speed reduction of a high torque.

According to another form of the present invention, the transmission can be applied to an optical apparatus such as a photo-taking lens or a camera to thereby make the optical apparatus compact. Moreover, the number of parts can be reduced and assembly is easy and inexpensive manufacture becomes possible. Further, optical means such as a focal length changing lens can be driven highly accurately.

Also, a rotational output free of backlash can be obtained and moreover, the sound intercepting and vibration suppressing effects can also be obtained and therefore, good responsiveness can be obtained during focusing, zooming and the operation of optical means such as an iris, and movement free of twitching can be obtained during rise.

What is claimed is:

1. A speed reducer comprising:

a fixed first member;

a second member opposed to said first member;

a pressing member for pressing and inclining said second member and making it bear against said first member, and pressing said second member so that the bearing portion thereof describes a circular locus, wherein said second member meshes with said first member;

an output shaft; and a connecting member connecting said second member and said output shaft together, with said connecting member permitting eccentricity between said second member and said output shaft, wherein said connecting member permits any inclination of said second member relative to said output shaft and any displacements of said second member relative to said output shaft in two directions which are substantially orthogonal to each other and are substantially perpendicular to said output shaft.

2. A speed reducer according to claim 1, wherein said first and second members have gears differing in the number of teeth from each other.

3. A speed reducer according to claim 1, wherein said connecting member is flexible so that said second member may be inclined.

4. A speed reducer according to claim 1, further including a motor-driven rotary shaft coaxial with said output shaft, said pressing member being provided on said rotary shaft.

5. A speed reducer according to claim 1, wherein said pressing member presses only one portion of said second member, said portion corresponding to a portion of said second member borne against said first member.

6. A speed reducer according to claim 1, wherein said pressing member presses plural portions of said second member, one of said plural portions corresponding to a portion of said second member borne against said first member, the other of said plural portions pressed in order to stabilize motion of said second member.

7. A speed reducer according to claim 1, wherein said connecting member comprises a first pair of pins provided on said output shaft, a second pair of pins provided on said second member, and a transmitting member having an engagement portion engaged with each of said first and second pairs of pins, said engagement portions having such shape that said engagement portions permit relative movement between said both pairs of pins and said transmitting member.

8. A speed reducer according to claim 7, wherein each of said first and second pairs of pins has a tapered portion.

9. A speed reducer according to claim 8, wherein said transmitting member is elastic and deformed by being pressed by said tapered portions.

10. A speed reducer, comprising:
  a first gear fixed to a casing and disposed in the form of a ring;
  a second gear having a difference in the number of teeth from said first gear and disposed in the form of a ring in opposed relationship with said first gear;
  an output shaft connected to said second gear;
  a pressing member for pressing said second gear into partly meshing engagement with said first gear while rotating with an input shaft, with said second gear being pressed by said pressing member and pivotally moved with said output shaft; and
  a connecting member for connecting said second gear and said output shaft, said connecting member permitting eccentricity between said second gear and said output shaft, wherein
    said connecting member comprises a first pair of pins provided on said output shaft, a second pair of pins provided on said second gear, and a transmitting member having an engagement portion engaged with each of said first and second pairs of pins, said engagement portions having such shape that said engagement portions permit relative movement between said both pairs of pins and said transmitting member.

11. A speed reducer according to claim 10, wherein said pressing member presses only one portion of said second gear, said portion corresponding to a portion of said second gear meshing with said first member.

12. A speed reducer according to claim 10, wherein said pressing member presses plural portions of said second gear, one of said plural portions corresponding to a portion of said second gear meshing with said first gear, the other of said plural portions pressed in order to stabilize motion of said second gear.

13. A speed reducer according to claim 10, wherein each of said first and second pairs of pins has a tapered portion.

14. A speed reducer according to claim 13, wherein said transmitting member is elastic and deformed by being pressed by said tapered portions.

* * * * *

UNITED STATES PATENT AND TRADEMARK OFFICE
CERTIFICATE OF CORRECTION

PATENT NO. : 5,893,813

DATED : April 13, 1999

INVENTOR(S) : Yamamoto

It is certified that error appears in the above-identified patent and that said Letters Patent is hereby corrected as shown below:

Title page, item
[56] REFERENCES CITED:

FOREIGN PATENT DOCUMENTS, "4191546" should read --4-191546-- and "599283" should read --5-99283--.

[57] ABSTRACT:

Line 2, "a pressing member and" should read --and a pressing member--.

COLUMN 7:

Line 47, "4 as and" should read --4 and--.

Signed and Sealed this

Twelfth Day of September, 2000

Attest:

Q. TODD DICKINSON

*Attesting Officer*  *Director of Patents and Trademarks*